(12) United States Patent
Nakamura et al.

(10) Patent No.: US 8,525,475 B2
(45) Date of Patent: Sep. 3, 2013

(54) MANAGEMENT SYSTEM FOR EXCHANGE ELECTRIC STORAGE DEVICES AND MANAGEMENT METHOD FOR EXCHANGE ELECTRIC STORAGE DEVICES

(75) Inventors: Toru Nakamura, Toyota (JP); Shinji Ichikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 344 days.

(21) Appl. No.: 12/975,841

(22) Filed: Dec. 22, 2010

(65) Prior Publication Data

US 2011/0156662 A1 Jun. 30, 2011

(30) Foreign Application Priority Data

Dec. 25, 2009 (JP) ................................. 2009-295149

(51) Int. Cl.
*H02J 7/00* (2006.01)
(52) U.S. Cl.
USPC ............................................ 320/109; 104/34
(58) Field of Classification Search
USPC ............................. 320/109, DIG. 34; 104/34
See application file for complete search history.

(56) References Cited

U.S. PATENT DOCUMENTS

| | | | | |
|---|---|---|---|---|
| 5,694,019 A | * | 12/1997 | Uchida et al. ................. | 320/106 |
| 5,711,648 A | * | 1/1998 | Hammerslag ................. | 414/800 |
| 6,094,028 A | * | 7/2000 | Gu et al. ....................... | 320/109 |
| 6,940,254 B2 | * | 9/2005 | Nagamine et al. ............ | 320/109 |
| 8,164,300 B2 | * | 4/2012 | Agassi et al. ................. | 320/104 |
| 2008/0281732 A1 | * | 11/2008 | Yamada .......................... | 705/30 |
| 2009/0082957 A1 | * | 3/2009 | Agassi et al. ................. | 701/208 |
| 2010/0094496 A1 | * | 4/2010 | Hershkovitz et al. .......... | 701/22 |
| 2010/0145717 A1 | * | 6/2010 | Hoeltzel ....................... | 705/1.1 |

FOREIGN PATENT DOCUMENTS

| | | |
|---|---|---|
| JP | 05064301 A | 3/1993 |
| JP | 11150809 A | 6/1999 |
| JP | 2004126669 A | 4/2004 |
| JP | 2005164604 A | 6/2005 |
| JP | 2007182310 A | 7/2007 |
| JP | 2008250786 A | 10/2008 |

* cited by examiner

*Primary Examiner* — Yalkew Fantu
*Assistant Examiner* — Manuel Hernandez
(74) *Attorney, Agent, or Firm* — Gifford, Krass, Sprinkle, Anderson & Citkowski, P.C.

(57) ABSTRACT

A PC executes a program including a step of selecting an exchange electric storage device with the shortest charging history when a charging request is present, inventory of exchange electric storage devices with completed charging is available, the number of inventory days is equal to or less than A days, and the sufficient number of storage locations is ensured, a step of selecting an exchange electric storage device with the longest charging history when the sufficient number of storage locations is not ensured, and a step of executing charging control when the selected exchange electric storage device is connected to a charger.

7 Claims, 4 Drawing Sheets

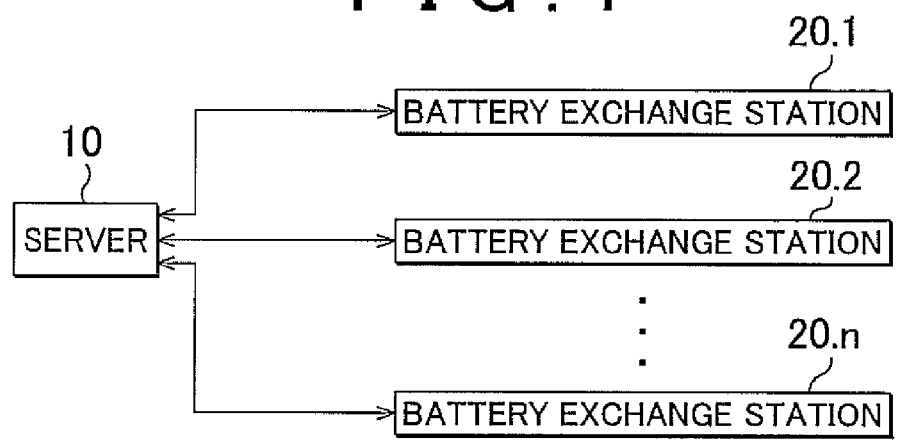
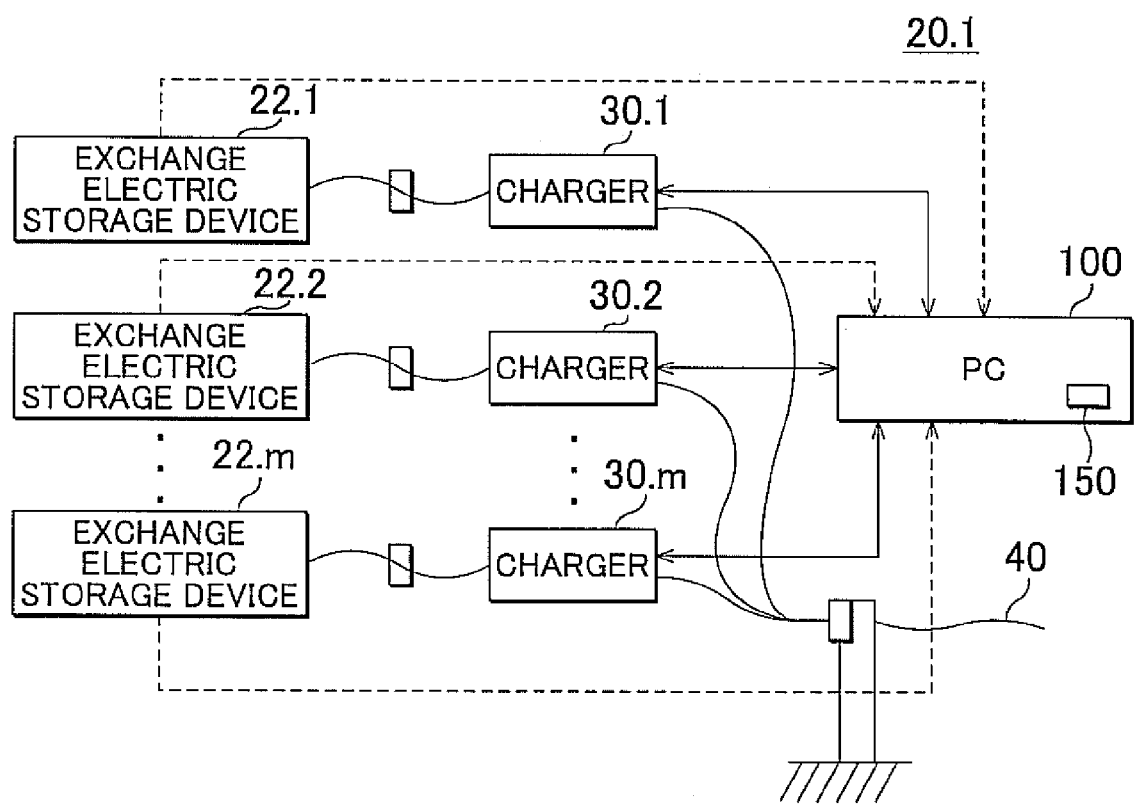

MANAGEMENT SYSTEM FOR EXCHANGE ELECTRIC STORAGE DEVICES AND MANAGEMENT METHOD FOR EXCHANGE ELECTRIC STORAGE DEVICES

CROSS-REFERENCE TO RELATED APPLICATIONS

This application claims priority to Japanese Patent Application No. 2009-295149 filed on Dec. 25, 2009, which is incorporated herein by reference in its entirety including the specification drawings and abstract.

BACKGROUND OF THE INVENTION

1. Field of the Invention

The invention relates to a management system and a management method for managing the exchange sequence of exchange electric storage devices for exchanging electric storage devices installed on vehicles, and more particularly to a technique for setting an exchange electric storage device as a preferential exchange object according to a degree of deterioration of a plurality of exchange electric storage devices that are being stored.

2. Description of the Related Art

Hybrid vehicles and electric automobiles that travel by using drive power from a motor have recently attracted attention as means for solving environmental problems. An available technique employed in such vehicles is to install electric storage devices such as secondary batteries and charge these electric storage devices by using commercial power supplied to the home of the vehicle owner.

In addition to the possibility of charging the electric storage device at home, the user of a vehicle where the electric storage device is installed can be provided per request with a paid service of exchanging the electric storage device with decreased charge amount for a charged electric storage device. At the locations where such service is provided, a plurality of exchange electric storage devices are managed to provide the aforementioned service to a plurality of users.

Concerning the provision of such service, for example, Japanese Patent Application Publication No. 2007-182310 (JP-A-2007-182310) discloses a storage battery circulation management system that can save user's time and effort required for a charging operation. Such a storage battery circulation management system manages circulation of charged storage batteries between a plurality of stations where the storage batteries are exchanged. The storage battery circulation management system includes a station terminal device disposed at a station and managing inventory information for the storage batteries, a movable body terminal device that is disposed on a movable body that transports a charged storage battery, and a central management device configured to be data communicable with the station terminal device and the movable body terminal device. The station terminal device transmits data relating to the inventory information to the central management device at a predetermined timing. The central management device uses the data relating to the inventory information to generate data relating to storage battery transportation information, and transmits the storage battery transportation information to the movable body terminal device.

With the aforementioned storage battery circulation management system disclosed in JP-A-2007-182310, the charged storage batteries can be efficiently circulated between the stations where the storage batteries are exchanged and user's time and effort required for a charging operation can be saved.

In particular, where the exchange object is a storage battery to be used for driving an electric automobile, long-distance use of electric automobiles by the users can be enabled and a contribution can be made to popularization of electric automobiles.

However, when a plurality of exchange electric storage devices are to be exchanged, there can be a shortage of storage locations for exchange electric storage devices. The resultant problem is that the exchange electric storage devices cannot be adequately managed. Further, when deteriorated exchange electric storage devices are stored for a long time in a discharged state or a state close to a fully charged state, the deterioration thereof further advances. The resultant problem is that the plurality of stored exchange electric storage devices cannot be managed so as to ensure a uniform degree of deterioration.

In the electric storage device circulation system disclosed in JP-A-2007-182310, these problems are neither taken into account nor resolved.

SUMMARY OF THE INVENTION

The invention relates to a management system for exchange electric storage devices and a management method for exchange electric storage devices that perform management such as to obtain a uniform degree of deterioration for a plurality of exchange electric storage devices, while ensuring the sufficient number of storage locations for a plurality of exchange electric storage devices.

A management system for exchange electric storage devices according to one aspect of the invention manages a sequence used for exchanging a plurality of exchange electric storage devices stored in storage locations to be exchanged with an electric storage device installed on a vehicle. This management system includes an estimation unit that estimates an inventory number of exchange electric storage devices that changes due to exchange of the exchange electric storage devices; a first determination unit that determines whether or not the inventory number exceeds a threshold value having, as an upper limit, a number of the exchange electric storage devices that can be stored in the storage locations; and a first selection unit that preferentially selects, as an exchange object for the electric storage device installed on the vehicle, an exchange electric storage device with the largest degree of deterioration from among the plurality of exchange electric storage devices when the inventory number is determined to exceed the threshold value by the first determination unit.

A management method for exchange electric storage devices according to another aspect of the invention manages a sequence used for exchanging a plurality of exchange electric storage devices stored in storage locations to be exchanged with an electric storage device installed on a vehicle. The management method includes estimating an inventory number of exchange electric storage devices that changes due to exchange of the exchange electric storage devices; determining whether or not the inventory number exceeds a threshold value having, as an upper limit, a number of the exchange electric storage devices that can be stored in the storage locations; and preferentially selecting, as an exchange object for the electric storage device installed on the vehicle, an exchange electric storage device with the largest degree of deterioration from among the plurality of exchange electric storage devices when the inventory number is determined to exceed the threshold value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 illustrates the relationship between a server and a battery exchange station;

FIG. 2 illustrates a schematic configuration of a battery exchange station;

DETAILED DESCRIPTION OF THE PREFERRED EMBODIMENTS

Figure 3:
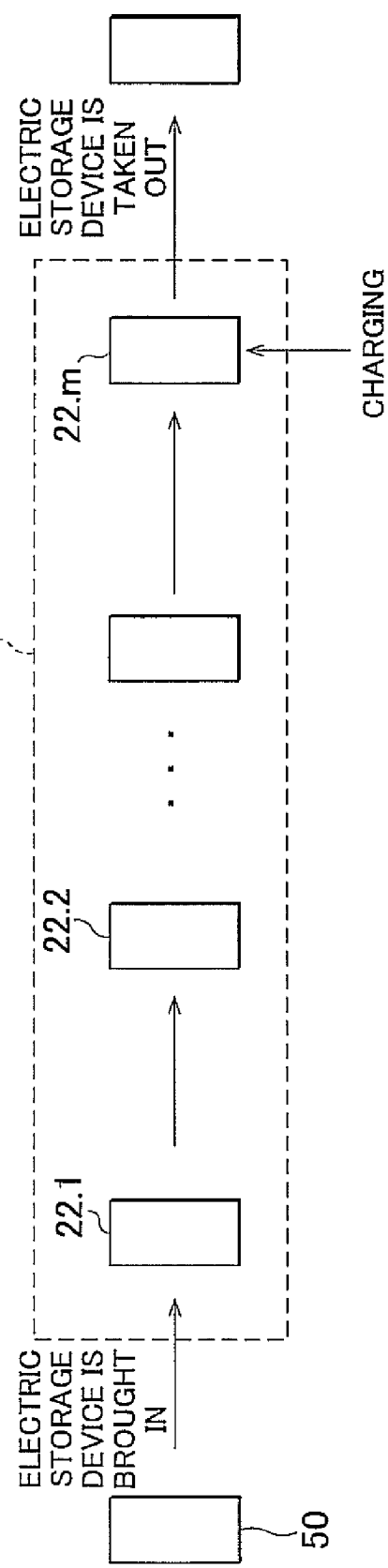
FIG. 3 illustrates the sequence used for exchanging the exchange electric storage deices stored in a battery exchange station.

An embodiment of the invention will be described below with reference to the appended drawings. In the explanation below, like components will be assigned with like reference numerals and will have like names and functions. Accordingly, detailed explanation thereof will not be repeated.

As shown in FIG. 1, in the present embodiment, a plurality of battery exchange stations 20.1 to 20.n is connected to a server 10.

The server 10 acquires information of various kinds from the plurality of battery exchange stations 20.1 to 20.n and stores the acquired information in an internal storage medium (for example, a memory or a hard disk). Further, when a request for information is received from at least any one of the plurality of battery exchange stations 20.1 to 20.n, the server 10 reads the requested information from the storage medium and transmits the information that has been read to the battery exchange station that has requested the information.

The information includes information on the number of exchange electric storage devices with completed charging in each of the plurality of battery exchange stations 20.1 to 20.n, vacancy information on storage locations of exchange electric storage devices, information on exchange electric storage devices stored in each of the plurality of battery exchange stations 20.1 to 20.n, and information on expected customer arrival. Each of the plurality of battery exchange stations 20.1 to 20.n can acquire information of various kinds relating to the neighboring or peripheral battery exchange stations from the server 10.

As shown in FIG. 2, the battery exchange station 20.1 includes a PC 100, a total of m chargers 30.1 to 30.m, and a total of m exchange electric storage devices 22.1 to 22.m. Since other battery exchange stations have the same configuration, the detailed explanation thereof will not be repeated. The number of chargers may be less than m.

The exchange electric storage devices 22.1 to 22.m are, for example, secondary batteries such as lithium ion batteries and nickel hydrogen batteries or capacitors. The chargers 30.1 to 30.m charge the exchange electric storage devices 22.1 to 22.m by using a commercial power source 40.

The PC 100 stores the information on the number of exchange electric storage devices with completed charging, vacancy information on storage locations of exchange electric storage devices, information on exchange electric storage devices stored in the battery exchange station 20.1, and information on expected customer arrival in a storage medium 150 such as memory or a hard disk, and for example updates the information with a preset period (for example, once a day or twice a day: in the morning and in the afternoon), and transmits the updated information to the server 10. The server 10 uses the received information to update information recorded in the recording medium of the server 10. The transmission period is not limited to one or two transmissions per day.

The recording medium 150 of the PC 100 stores the number of exchange electric storage devices with completed charging from among the presently available exchange electric storage devices 22.1 to 22.m stored in the battery exchange station 20.1.

Each time new charging of the exchange electric storage devices is completed, the PC 100 increases the number of exchange electric storage devices with completed charging that is stored in the recording medium 150 and updates the number recorded in the recording medium 150. Further, each time the electric storage device with completed charging is used for exchange, the PC 100 decreases the number of exchange electric storage devices with completed charging that is stored in the recording medium 150 and updates the number recorded in the recording medium 150. The PC 100 may calculate the number of exchange electric storage devices with completed charging by the number of the below-described flags indicating the completion of charging.

Further, the PC 100 estimates the inventory number of the exchange electric storage devices on the basis of information on expected customer arrival in an estimation period. The information on expected customer arrival includes the number of exchange electric storage devices that is expected to be brought in to the battery exchange station 20.1 within the estimation period (described hereinbelow as "due-in number") and the number of exchange electric storage devices that is expected to be taken out from the battery exchange station 20.1 due to exchange, transfer to other battery exchange stations, or disposal because of deterioration (described hereinbelow as "due-out number"). The estimation period may be a period from the present time to the transmission of next update information or a period from the present time to a predetermined point of time in the future. The inventory number as referred to herein is an assumed number of exchange electric storage devices after the estimation period elapses.

The PC 100 adds up the due-in number within the estimation period to the present number of exchange electric storage devices and subtracts the due-out number, thereby estimating the inventory number of the exchange electric storage devices after the estimation period elapses.

The PC 100 estimates the due-in number and due-out number, for example, by adding a correction value to the number of reservations by users within the estimation period. The correction number takes into account, for example, the estimated number of reservation cancellations, estimated number of customers that will arrive without reservations, estimated number of transferred devices, and number of exchange electric storage devices that are scheduled for disposal, and the correction number is set to reflect the effect of season or day of the week. The correction value may be set in advance.

The PC 100 compares the estimated inventory number with an allowed number of exchange electric storage device that can be stored and acquires vacancy information of the storage locations for exchange electric storage devices. The vacancy information of the storage locations includes information on the additional number of exchange electric storage devices that can be stored within the estimation period. The PC 100 acquires the vacancy information of the storage locations by subtracting the inventory number from the allowed number.

When an exchange electric storage device is brought in to the battery exchange station 20.1, the PC 100 acquired information on the exchange electric storage device from the exchange electric storage device that has been brought in and stores the acquired information in the storage medium 150. The information on the exchange electric storage device includes information on State Of Charge (SOC) representing a state of charge of the exchange electric storage device, the number of years in use, and charging history. The charging history is a numerical representation of the degree of deterioration for the exchange electric storage device, for example, such that a larger value indicates a more advanced state of deterioration.

The PC 100 reads the information on the exchange electric storage device from the memory of the exchange electric storage device. The PC 100 may also estimate the SOC on the basis, for example, of an open-circuit voltage of the exchange electric storage device when it is brought in to the battery exchange station 20.1. Further, the PC 100 may acquire the number of years in use by reading the manufacturing date or the usage start date from the memory of the exchange electric storage device.

Further, when an exchange electric storage device is brought in to the battery exchange station 20.1, the PC 100 assigns an ID specifying a storage location in the battery exchange station 20.1 for the exchange electric storage device that has been brought in. The PC 100 also associates the date and hour at which the exchange electric storage device has been brought in (referred to hereinbelow as "date and hour of reception"), SOC, the number of years in use, and charging history with the assigned ID. The PC 100 deletes the assigned ID when the exchange electric storage device is taken out for exchange.

For example, the PC 100 creates a table in which the assigned ID, date and hour of reception, SOC, number of years in use, charging history, and a flag indicating the completion of charging (the flag is set ON when the charging is completed) are associated with each other and stores the table in the storage medium 150. The PC 100 updates the table stored in the storage medium 150 when an exchange electric storage device is brought in and taken out.

When at least any one of the exchange electric storage devices 22.1 to 22.m is connected to a corresponding charger from among the chargers 30.1 to 30.m, the PC 100 controls the charger so that the exchange electric storage device connected to the charger is charged in response to a charging request that has been set before a point in time that has been set in advance with respect to the reservation time at which the user will arrive. The PC 100 may update the aforementioned table when the SOC of the exchange electric storage device is changed by charging when the charging is completed.

In each of the battery exchange stations 20.1 to 20.n having the above-described configuration, the number of storage locations for the exchange electric storage devices can be insufficient depending on the exchange state of a plurality of exchange electric storage devices. Therefore, the management of the exchange electric storage devices sometimes is not conducted adequately.

Further, when a deteriorated exchange electric storage device is stored for a long time in a discharged state or a state close to a fully charged state, the deterioration is further advanced. As a result, the management is sometimes conducted such that does not ensure a uniform degree of deterioration of the plurality of stored exchange electric storage devices.

For example, let us assume, as shown in FIG. 3, that an electric storage device 50 installed on a vehicle is brought in as a new exchange electric storage device. In this case, where the exchange electric storage device 22.m that has been brought in to the battery exchange station 20.1 earlier than any other of the exchange electric storage devices 22.1 to 22.m is taken out, for example, even when this exchange electric storage device has advanced deterioration or a SOC lower than the lower limit value of the SOC range suitable for storage, or has a SOC higher than the higher limit value of the SOC range suitable for storage due to individual difference in the history of use (degree of deterioration and SOC when the exchange electric storage device was brought in) of the electric storage devices, this device can be the last in the sequence for taking out and the degree of deterioration thereof can become even larger than in other exchange electric storage devices due to long-term storage.

Accordingly, in the present embodiment the PC 100 estimates the inventory number of the exchange electric storage devices that changes due to exchange of the exchange electric storage devices, determines whether or not the inventory number exceeds a threshold value having, as an upper limit, a number of the exchange electric storage devices that can be stored in the storage locations, and preferentially selects, as an exchange object for an electric storage device installed on the vehicle, an exchange electric storage device with the largest degree of deterioration from among the plurality of exchange electric storage devices when the inventory number is determined to exceed the threshold value.

Further, the PC 100 preferentially selects, as the exchange object, an exchange electric storage device with the smallest degree of deterioration from among the plurality of exchange electric storage devices when the inventory number is determined not to exceed the threshold value.

Further, the PC 100 determines whether or not a storage period of at least any one of the plurality of exchange electric storage devices exceeds a preset storage period, and preferentially selects, as the exchange object, an exchange electric storage device with the longest storage period from among the plurality of exchange electric storage devices, regardless of the inventory number, when a storage period of at least any one of the plurality of exchange electric storage devices is determined to exceed the preset storage period.

Further, the PC 100 determines whether or not a state of charge of at least any one of the plurality of exchange electric storage devices is a preset state with completed charging, and preferentially selects, as the exchange object, an exchange electric storage device for which the state of charge is the closest to the preset state of charge from among the plurality of exchange electric storage devices, regardless of the inventory number and the storage period, when the state of charge of the plurality of exchange electric storage devices is determined not to be the preset state.

Figure 4:
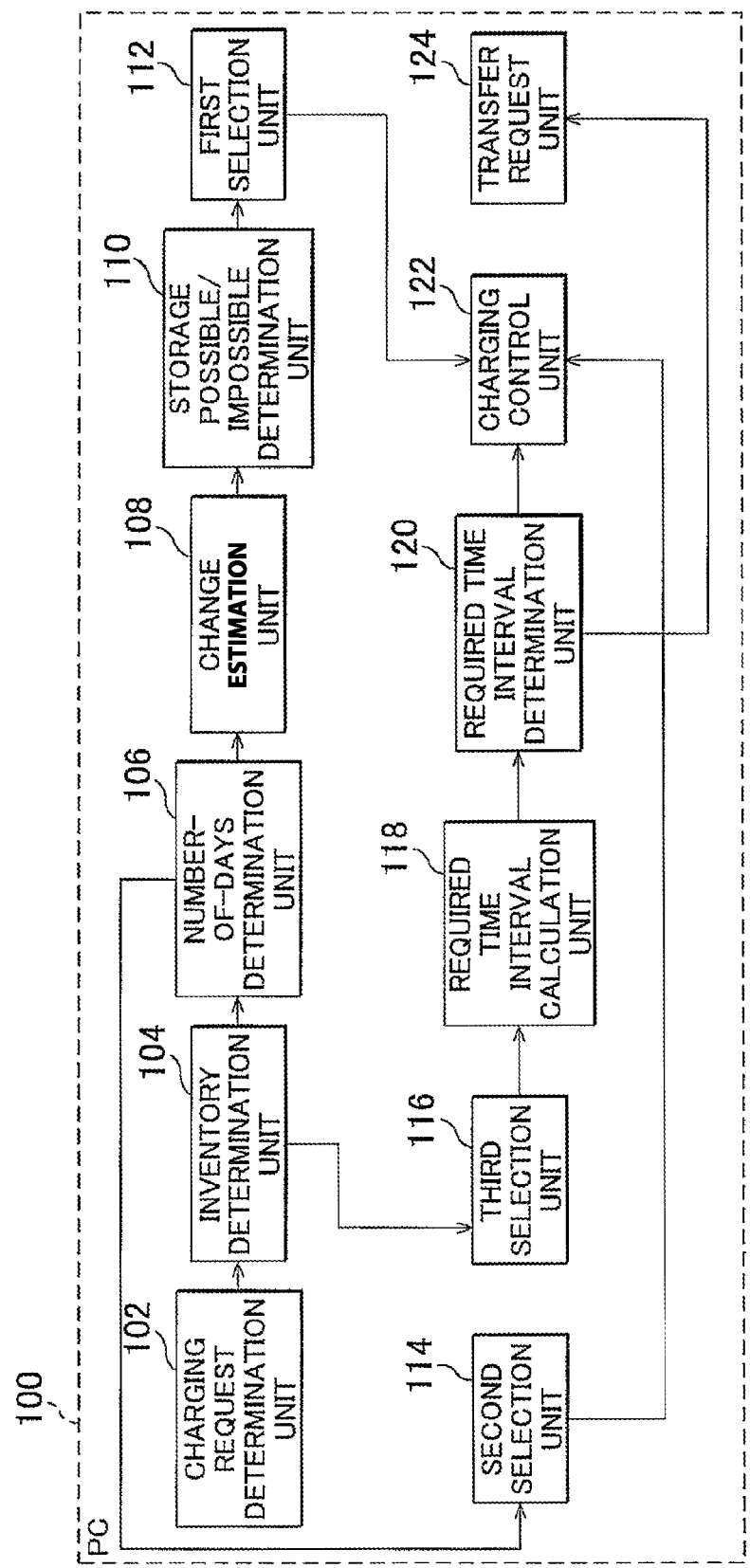
FIG. 4 is a functional block diagram of a personal computer (abbreviated hereinbelow as PC) 100 that realizes a management system for exchange electric storage devices according to the present embodiment.

FIG. 4 shows a control structure of a program executed by the PC 100 for realizing the management system for exchange electric storage devices according to the present embodiment.

The PC 100 includes a charging request determination unit 102, an inventory determination unit 104, a number-of-days determination unit 106, a change estimation unit 108, a storage possible/impossible determination unit 110, a first selection unit 112, a second selection unit 114, a third selection unit 116, a required time interval calculation unit 118, a required time interval determination unit 120, a charging control unit 122, and a transfer request unit 124.

The charging request determination unit 102 determines the presence of a charging request. More specifically, the charging request determination unit 102 determines that there is a charging request, when the present point in time is before the time set in advance as an appointment time at which the user will arrive. For example, when the charging request determination unit 102 determines that a charging request is present, the charging request determination unit may set ON a charging request determination flag and set OFF the flag at a predetermined time thereafter.

The inventory determination unit 104 determines whether or not charging of at least any one of the plurality of exchange electric storage devices 22.1 to 22.m is completed when the charging request has been determined to be present. The inventory determination unit 104 determines that charging of at least any one of the plurality of exchange electric storage devices 22.1 to 22.m is completed when a SOC of any one exchange electric storage device from among the plurality of exchange electric storage devices 22.1 to 22.m is equal to or higher than a preset value.

For example, the inventory determination unit 104 determines whether or not charging of at least any one of the plurality of exchange electric storage devices 22.1 to 22.m is completed when the charging request determination flag has been set ON, and where charging of at least any one of the plurality of exchange electric storage devices 22.1 to 22.m is determined to be completed, the inventory determination unit may set ON an inventory determination flag.

When charging is determined to be completed for any one from among the plurality of exchange electric storage devices 22.1 to 22.m, the number-of-days determination unit 106 determines whether or not the number of days the exchange electric storage device for which charging has been determined to be completed has been in stock is within a preset number A of days. For example, when a SOC of an exchange electric storage device has decreased below the lower limit value of the range of SOC suitable for storage, the number-of-days determination unit 106 calculates the number of days in stock by the difference between the date and time at which the SOC has decreased to the present date and time. For example, when the SOC at the time the exchange electric storage device is taken in is below the lower limit value of the SOC suitable for storage, the number-of-days determination unit 106 calculates the number of days in stock by the difference between the date and time at which the exchange electric storage device has been taken in and the present date and time.

For example, when the inventory determination flag is ON, the number-of-days determination unit 106 may determine whether or not the number of days in stock of all of the exchange electric storage devices for which charging has been determined to be completed is within the preset number A of days, and when the number of days in stock of all of the exchange electric storage devices is determined to be within the preset number A of days, the number-of-days determination unit may set ON the number-of-days determination flag. When the number of days in stock of at least any one of the exchange electric storage devices for which charging has been determined to be completed exceeds the preset number A of days, the number-of-days determination flag may be set OFF.

When the number of days in stock of all of the exchange electric storage devices is determined to be within the preset number A of days, the change estimation unit 108 adds the number of exchange electric storage devices that are due in within the estimation period to the present number of exchange electric storage devices and subtracts the number of exchange electric storage device that are due out, thereby estimating the inventory number of the exchange electric storage devices in the estimation period. The method for estimating the inventory number is described above and detailed explanation thereof will not be repeated.

The present number of exchange electric storage devices is calculated, for example, on the basis of the bring-in and take-out exchange history of exchange electric storage devices that have already been exchanged. Thus, the present number of exchange electric storage device is calculated by increasing the number of exchange electric storage devices before the bring-in operation by the number of exchange electric storage device that have been brought in each time the exchange electric storage devices are brought in and by decreasing the number of exchange electric storage device before the take-out operation by the number of exchange electric storage device that have been taken out each time the exchange electric storage devices are taken out. The calculated number may be stored in the storage medium 150 or the like. Alternatively, the number that has already been stored may be updated to the calculated number. The above-described bring-in and take-out exchange history may be created by the operator by inputting data into the PC 100.

The storage possible/impossible determination unit 110 determines whether or not a sufficient number of storage locations for storing the exchange electric storage devices is ensured on the basis of the inventory number estimated by the change estimation unit 108. More specifically, when the inventory number does not exceed a threshold value having, as an upper limit, the number of the exchange electric storage devices that can stored in the storage locations, the storage possible/impossible determination unit 110 determines that a sufficient number of storage locations is ensured, and when the inventory number exceeds the threshold value, the sufficient number of storage locations is determined not to be ensured.

The "storage location" as referred to herein is not only the space provided in the battery exchange station 20.1 and may include a vacant space in the battery exchange station neighboring to the battery exchange station 20.1 or a peripheral battery exchange station. Thus, for example, "the number of exchange electric storage devices that can be stored in the storage locations" may be the maximum number of exchange electric storage devices that can be stored in each of the battery exchange stations 20.1 to 20.n or the sum total of the maximum number of exchange electric storage devices that can be stored in each of the battery exchange stations 20.1 to 20.n and the number that can be stored that is determined on the basis of vacancy information on the storage locations in one or several neighboring or peripheral battery exchange stations. The threshold value is set in advance and may be a value equal to or lower than the number of exchange electric storage devices that can be stored in storage locations. This number is not particularly limited.

For example, when the sufficient number of storage locations for storing the exchange electric storage devices has been determined to be ensured, the storage possible/impossible determination unit 110 may set ON the storage determination flag, and when the sufficient number of storage locations is not determined to be ensured, the storage determination flag may be set OFF.

When the storage possible/impossible determination unit 110 determines that the sufficient number of storage locations has been ensured (for example, when the storage determination flag is ON), the first selection unit 112 preferentially selects, as an exchange object for an electric storage device installed on the vehicle, an exchange electric storage device with the shortest charging history from among the exchange electric storage devices.

When the sufficient number of storage locations is determined not to be ensured (for example, when the storage determination flag is OFF), the first selection unit 112 preferentially selects, as an exchange object for an electric storage device installed on the vehicle, an exchange electric storage device with the longest charging history from among the exchange electric storage devices.

For example, the first selection unit 112 numerically represents the charging history by multiplying a charging depth, a number of charging cycles, and a constant corresponding to the number of years. The first selection unit 112 may numerically represent the degree of deterioration on the basis of the temperature of the exchange electric storage device and the internal resistance of the exchange electric storage device, but the above-described methods are not limiting.

When the number-of-days determination unit 106 has determined that the number of days in stock of an exchange electric storage device exceeds the number A of days (for example, when the number-of-days determination flag is OFF), the second selection unit 114 preferentially selects, as an exchange object for an electric storage device installed on the vehicle, an exchange electric storage device with the largest number of days in stock from among the plurality of exchange electric storage devices for which the preset number A of days has been determined to be exceeded.

When charging of all of the exchange electric storage devices 22.1 to 22.m has been determined by the inventory determination unit 104 not to be completed (for example, when the inventory determination flag is OFF), the third selection unit 116 preferentially selects, as an exchange object for an electric storage device installed on the vehicle, an exchange electric storage device with the largest SOC from among the exchange electric storage devices 22.1 to 22.m.

The required time interval calculation unit 118 calculates the time interval required for a SOC of the selected exchange electric storage device to reach the present SOC when the exchange electric storage device selected by the third selection unit 116 is charged. The preset SOC is a SOC that can be determined when charging is completed.

The required time interval determination unit 120 determines whether or not the calculated required time interval is less than a preset time interval. The preset time interval may be, for example, a time interval required to transfer an exchange electric storage device with completed charging to another battery exchange station, but this time interval is not particularly limited. For example, when the calculated required time interval is within the present time interval, the required time interval determination unit 120 may set ON the required time interval determination flag.

When the exchange electric storage device selected by the first selection unit 112 is connected to a charger or when the exchange electric storage device selected by the second selection unit 114 is connected to a charger, the charging control unit 122 executes charging control such that the SOC of the connected exchange electric storage device becomes the preset SOC.

Further, when the exchange electric storage device selected by the third selection unit 116 is connected to a charger and the required time interval is determined to be within the present time interval by the required time interval determination unit 120, the charging control unit 122 also executes charging control such that the SOC of the connected exchange electric storage device becomes the preset SOC.

When the required time interval is determined to exceed the present time interval by the required time interval determination unit 120, the transfer request unit 124 requests the transfer of an exchange electric storage device with completed charging from another battery exchange station. For example, the transfer request unit 124 may send a request for a transfer of an exchange electric storage device via a server 10 to a PC of the neighboring battery exchange station or may request the transfer of an exchange electric storage device by notifying an operator of the PC 100.

In the present embodiment, the charging request determination unit 102, inventory determination unit 104, number-of-days determination unit 106, change estimation unit 108, storage possible/impossible determination unit 110, first selection unit 112, second selection unit 114, third selection unit 116, required time interval calculation unit 118, required time interval determination unit 120, charging control unit 122, and transfer request unit 124 are all explained to function as software realized by executing the program stored in the storage medium 150 by a central processing unit (CPU) of the PC 100, but these units may be also realized by hardware.

Figure 5:
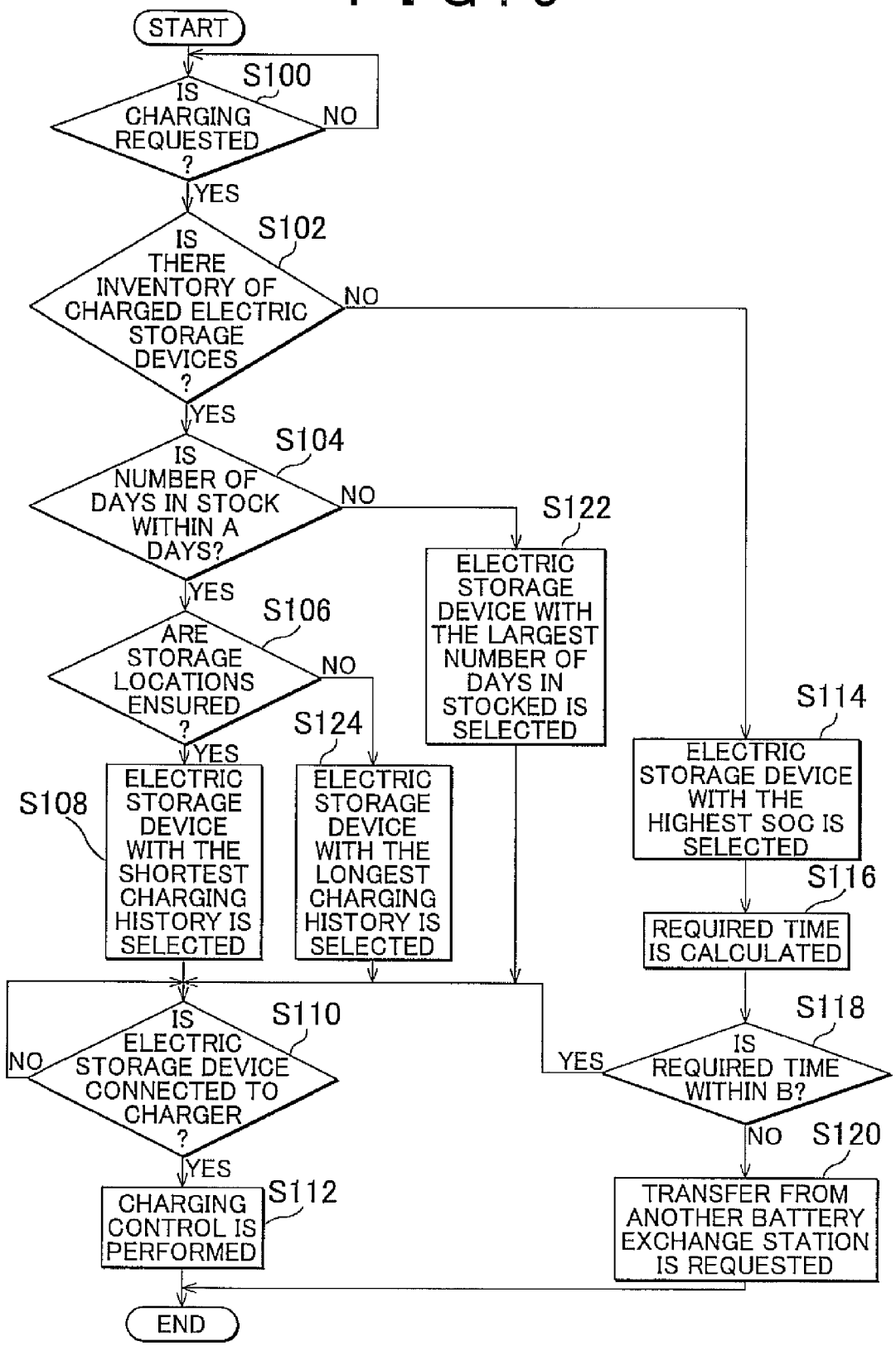
FIG. 5 is a flowchart illustrating a control structure of a program executed by the PC 100 that realizes a management system for exchange electric storage devices according to the present embodiment.

A control structure of a program executed by the PC 100, which is the management system for exchange electric storage devices of the present embodiment, will be described below with reference to FIG. 5.

In step 100 (the word "step" will be abbreviated below as "S"), the PC 100 determines whether or not a charging request is present. Where a charging request is present (YES in S100), the processing moves to S102. Otherwise (NO in S100), the processing returns to S100.

In S102, the PC 100 determines whether there is an inventory of exchange electric storage devices with completed charging. Where the inventory of exchange electric storage devices with completed charging, from among the exchange electric storage devices 22.1 to 22.m, is present (YES in S102), the processing moves to S104. Otherwise (NO in S102), the processing moves to S114.

In S104, the PC 100 determines whether or not the number of days in stock of all of the electric charging devices with completed charging, from among the exchange electric storage devices 22.1 to 22.m, is within the preset number A of days. Where the number of days in stock of the target electric storage devices is within the preset number A of days (YES in S104), the processing moves to S106. Otherwise (NO in S104), the processing moves to S122.

In S106, the PC 100 determines whether or not the sufficient number of storage locations has been ensured. When the inventory number is equal to or less than the number of exchange electric storage devices that can be stored in the storage locations and the PC 100 determines that the sufficient number of storage locations has been ensured (YES in S106), the processing moves to S108. Otherwise (NO in S106), the processing moves to S124.

In S108, the PC 100 preferentially selects, as an exchange object, an exchange electric storage device with the shortest charging history from among the exchange electric storage devices for which charging has been determined in S102 to be completed. In this case, the PC 100 may notify the operator so that the selected exchange electric storage device be connected to a charger, or the selected exchange electric storage device may be automatically connected to the charger.

In S110, the PC 100 determines whether or not the selected exchange electric storage device has been connected to the charger. For example, the PC 100 may determine that the selected exchange electric storage device has been connected to the charger when a signal indicating that the selected exchange electric storage device has been connected is received from the charger. Where the selected exchange electric storage device has been connected to the charger (YES in S110), the processing moves to S112. Otherwise (NO in S110), the processing returns to S110. In S112, the PC 100 executes charging control with respect to the connected exchange electric storage device. The PC 100 executes the charging control till the SOC of the connected exchange electric storage device becomes the SOC indicating the completion of charging.

In S114, the PC 100 selects an exchange electric storage device with the highest SOC, from among the exchange electric storage devices 22.1 to 22.m, as the exchange electric storage device that is an exchange object. In S116, when the selected exchange electric storage device is charged, the time required to complete the charging is calculated.

In S118, the PC 100 determines whether or not the calculated required time is within a preset time interval B. Where the calculated required time is within the preset time B (YES in S118), the processing moves to S110. Otherwise (NO in S118), the processing moves to S120.

In S120, the PC 100 requests that an exchange electric storage device with completed charging be transferred from the other battery exchange station. In S122, the PC 100 preferentially selects, as an exchange object, an exchange electric storage device with the largest number of days in stock, from among the exchange electric storage devices 22.1 to 22.m.

In S124, the PC 100 preferentially selects, as an exchange object, an exchange electric storage device with the longest charging history, from among the exchange electric storage devices 22.1 to 22.m.

The operation of the PC 100, which is the management system for exchange electric storage devices according to the present embodiment that is based on the structure and flowchart such as described above, will be explained below.

For example, where a charging request is determined to be present before a predetermined point in time that has been set in advance on the basis of the preset time of customer arrival (YES in S100), the presence of inventory of exchange electric storage devices with completed charging is determined (S102).

<Exchange Electric Storage Device with Completed Charging is Absent>

When an exchange electric storage device with completed charging is absent (NO in S102), an exchange electric storage device with the highest SOC, from among the exchange electric storage devices 22.1 to 22.m, is selected as an exchange object (S114) and a time required to complete the charging is calculated (S116). In a case in which the calculated required time is within the preset time interval B (YES in S118), when the selected exchange electric storage device has been connected (YES in S110), charging control is executed (S112). As a result, an exchange electric storage device with completed charging is quickly prepared in response to the charging request. By completing the charging immediately before the preset time of customer arrival, it is possible to reduce the deterioration of the exchange electric storage device to a minimum.

When the calculated required time is longer than the preset time interval (NO in S118), an exchange electric storage device with completed charging is requested to be transferred from another battery exchange station (S120). As a result, it is possible to prepare an exchange electric storage device with completed charging before a preset time of customer arrival. It is also possible to start charging the selected exchange electric storage device together with requesting the transfer.

<Exchange Electric Storage Device with Completed Charging is Present (1)>

When an exchange electric storage device with completed charging is present (YES in S102) and when the number of days in stock of at least any one of the exchange electric storage devices with completed charging exceeds the preset number A of days (NO in S104), an exchange electric storage device with the largest number of days in stock is selected from among the exchange electric storage devices for which the charging has been completed as an exchange object (S122). When the selected exchange electric storage device is connected (YES in S110), charging control is executed (S112). The exchange electric storage device with completed charging is exchanged for the electric storage device installed on the vehicle of the user who has arrived to the battery exchange station. By so selecting the exchange electric storage device with the longest number of days in stock, rather than selecting the exchange electric storage device according to the sequence of the earliest bring-in date and time, it is possible to prevent the exchange electric storage devices from being left unused for a long time. As a result, spread in battery performance among the plurality of exchange electric storage devices 22.1 to 22.m can be inhibited.

<Exchange Electric Storage Device with Completed Charging is Present (2)>

When the number of days in stock of all of the exchange electric storage devices with completed charging is within the preset number A of days (YES in S104) and when the sufficient number of storage locations has been ensured (YES in S106), an exchange electric storage device with the shortest charging history is selected as an exchange object from among the exchange electric storage devices (S108). When the selected exchange electric storage device has been connected (YES in S110), charging control is executed (S112). The exchange electric storage device with completed charging is exchanged for the electric storage device installed on the vehicle of the user who has arrived to the battery exchange station. By so preferentially providing an exchange electric storage device with the shortest charging history, rather than selecting the exchange electric storage device according to the sequence of the earliest bring-in date and time, it is possible to improve the uniformity of degree of deterioration advance among the exchange electric storage devices 22.1 to 22.m stored in the battery exchange station 20.1

<Exchange Electric Storage Device with Completed Charging is Present (3)>

When the number of days in stock of all of the exchange electric storage devices with completed charging is within the preset number A of days (YES in S104) and when the sufficient number of storage locations has not been ensured (NO in S106), an exchange electric storage device with the longest charging history is selected as an exchange object from among the exchange electric storage devices (S108). When the selected exchange electric storage device has been connected (YES in S110), charging control is executed (S112). The exchange electric storage device with completed charging is exchanged for the electric storage device installed on the vehicle of the user who has arrived to the battery exchange station. Further, the electric storage device with the longest charging history may be also preferentially selected as an object for disposal or transfer to another station with the object of ensuring storage locations, instead of using such an electric storage device as an exchange object for the electric storage device installed on the user's vehicle. By so preferentially providing an exchange electric storage device with the longest charging history, rather than selecting the exchange electric storage device according to the sequence of the earliest bring-in date and time, it is possible to improve the uniformity of degree of deterioration advance among the exchange electric storage devices 22.1 to 22.m stored in the battery exchange station 20.1, while advancing the disposal of deteriorated exchange electric storage devices and ensuring storage locations.

As described hereinabove, a management system for exchange electric storage devices according to one aspect of the invention manages a sequence used for exchanging a plurality of exchange electric storage devices stored in storage locations to be exchanged with an electric storage device installed on a vehicle. This management system includes an estimation unit that estimates an inventory number of exchange electric storage devices that changes due to exchange of the exchange electric storage devices; a first determination unit that determines whether or not the inventory number exceeds a threshold value having, as an upper limit, a number of the exchange electric storage devices that can be stored in the storage locations, and a first selection unit that preferentially selects, as an exchange object for an electric storage device installed on the vehicle, an exchange electric storage device with the largest degree of deterioration from among the plurality of exchange electric storage devices when the inventory number is determined to exceed the threshold value by the first determination unit.

The first selection unit may preferentially select, as the exchange object, an exchange electric storage device with the smallest degree of deterioration from among the plurality of exchange electric storage devices when the inventory number is determined not to exceed the threshold value by the first determination unit.

The management system may further include a calculation unit that calculates a deterioration degree of the exchange electric storage devices on the basis of a charging depth, a number of charging cycles, and a number of years in use of the exchange electric storage devices.

The management system may further include a first acquisition unit that acquires a storage period of each of the plurality of exchange electric storage devices; a second determination unit that determines whether or not a storage period of at least any one of the plurality of exchange electric storage devices exceeds a preset storage period, and a second selection unit that preferentially selects, as the exchange object, an exchange electric storage device with the longest storage period from among the plurality of exchange electric storage devices, regardless of the inventory number, when a storage period of at least any one of the plurality of exchange electric storage devices is determined to exceed the preset storage period by the second determination unit.

The management system may further include a second acquisition unit that acquires a state of charge of each of the plurality of exchange electric storage devices; a third determination unit that determines whether or not a state of charge of at least any one of the plurality of exchange electric storage devices is a preset state with completed charging, and a third selection unit that preferentially selects, as the exchange object, an exchange electric storage device for which the state of charge is the closest to the preset state of charge from among the plurality of exchange electric storage devices, regardless of the inventory number and the storage period, when a state of charge of at least any one of the plurality of exchange electric storage devices is determined not to be the preset state by the third determination unit.

With the management system for exchange electric storage devices according to the present embodiment, when the inventory number is determined to exceed the threshold value having, as an upper limit, a number of the exchange electric storage devices that can be stored in the storage locations, an exchange electric storage device with the largest degree of deterioration from among the plurality of exchange electric storage devices is preferentially selected as an exchange object for the electric storage device installed on a vehicle, or as a disposal or take-out object, and when the inventory number is determined not to exceed the threshold value, an exchange electric storage device with the smallest degree of deterioration from among the plurality of exchange electric storage devices is preferentially selected as an exchange object for the electric storage device installed on a vehicle. As a result, the disposal of deteriorated exchange electric storage devices can be enhanced, the required number of storage locations can be ensured, and the degree of deterioration of the exchange electric storage devices stored in the battery exchange station can be made uniform. Therefore, it is possible to provide a management system for exchange electric storage devices and a management method for exchange electric storage devices that perform management such as to obtain a uniform degree of deterioration for a plurality of exchange electric storage devices, while ensuring the sufficient number of storage locations for a plurality of exchange electric storage devices.

The embodiments disclosed herein are merely exemplary in all the aspects thereof and should not be considered as limiting. The scope of the invention is defined by the claims, rather than the description above, and is intended to include all modifications equivalent in meaning and scope to the claims.

What is claimed is:

1. A management system for exchange electric storage devices for managing a sequence used for exchanging a plurality of exchange electric storage devices stored in storage locations with an electric storage device installed on a vehicle, comprising:
    an estimation unit that estimates an inventory number of exchange electric storage devices that changes due to exchange of the exchange electric storage devices;
    a first determination unit that determines whether or not the inventory number exceeds a threshold value having, as an upper limit, a number of the exchange electric storage devices that can be stored in the storage locations; and
    a first selection unit that preferentially selects, as an exchange object for the electric storage device installed on the vehicle, an exchange electric storage device with a largest degree of deterioration from among the plurality of exchange electric storage devices when the inventory number is determined to exceed the threshold value by the first determination unit.

2. The management system for exchange electric storage devices according to claim 1, wherein the first selection unit preferentially selects, as the exchange object, an exchange electric storage device with a smallest degree of deterioration from among the plurality of exchange electric storage devices when the inventory number is determined not to exceed the threshold value by the first determination unit.

3. The management system for exchange electric storage devices according to claim 1, further comprising a calculation unit that calculates a deterioration degree of each of the exchange electric storage devices on the basis of a charging depth, a number of charging cycles, and a number of years in use of each of the exchange electric storage devices.

4. The management system for exchange electric storage devices according to claim 1, further comprising:
    a first acquisition unit that acquires a storage period of each of the plurality of exchange electric storage devices;
    a second determination unit that determines whether or not the storage period of at least any one of the plurality of exchange electric storage devices exceeds a preset storage period; and
    a second selection unit that preferentially selects, as the exchange object, an exchange electric storage device with a longest storage period from among the plurality of exchange electric storage devices, regardless of the inventory number, when the storage period of at least any one of the plurality of exchange electric storage devices is determined to exceed the preset storage period by the second determination unit.

5. The management system for exchange electric storage devices according to claim 4, further comprising:
 a second acquisition unit that acquires a state of charge of each of the plurality of exchange electric storage devices;
 a third determination unit that determines whether or not the state of charge of at least any one of the plurality of exchange electric storage devices is a preset state with completed charging; and
 a third selection unit that preferentially selects, as the exchange object, an exchange electric storage device for which the state of charge is closest to the preset state of charge from among the plurality of exchange electric storage devices, regardless of the inventory number and the storage period, when none of the plurality of exchange electric storage devices is determined to be in the preset state by the third determination unit.

6. A management system for exchange electric storage devices for managing a sequence used for exchanging a plurality of exchange electric storage devices stored in storage locations with an electric storage device installed on a vehicle, comprising:
 an estimation unit that estimates an inventory number of exchange electric storage devices that changes due to exchange of the exchange electric storage devices;
 a first determination unit that determines whether or not the inventory number exceeds a threshold value having, as an upper limit, a number of the exchange electric storage devices that can be stored in the storage locations; and
 a first selection unit that preferentially selects, as a disposal object, an exchange electric storage device with a largest degree of deterioration from among the plurality of exchange electric storage devices when the inventory number is determined to exceed the threshold value by the first determination unit.

7. A management method for exchange electric storage devices for managing a sequence used for exchanging a plurality of exchange electric storage devices stored in storage locations with an electric storage device installed on a vehicle, comprising:
 estimating an inventory number of exchange electric storage devices that changes due to exchange of the exchange electric storage devices;
 determining whether or not the inventory number exceeds a threshold value having, as an upper limit, a number of the exchange electric storage devices that can be stored in the storage locations; and
 preferentially selecting, as an exchange object for the electric storage device installed on the vehicle, an exchange electric storage device with a largest degree of deterioration from among the plurality of exchange electric storage devices when the inventory number is determined to exceed the threshold value.

* * * * *